United States Patent [19]

Onnen

[11] 4,099,938

[45] Jul. 11, 1978

[54] MIST ELIMINATOR CLEANING DEVICE

[75] Inventor: James H. Onnen, Louisville, Ky.

[73] Assignee: American Air Filter Company, Inc., Louisville, Ky.

[21] Appl. No.: 769,521

[22] Filed: Feb. 17, 1977

[51] Int. Cl.² ............................................. B01D 47/06
[52] U.S. Cl. ........................................ 55/230; 55/242
[58] Field of Search ................. 55/230, 237, 238, 242, 55/257 R, 257 PV, 257 QV, 257 MP, 257 PP, 257 HE, 463, 464

[56] References Cited

U.S. PATENT DOCUMENTS

| | | | |
|---|---|---|---|
| 1,041,617 | 10/1912 | Goodrich | 55/242 X |
| 2,226,127 | 12/1940 | Harmon | 55/237 X |
| 2,645,560 | 7/1953 | Otto | 55/257 R X |
| 3,387,432 | 6/1968 | Fearara | 55/230 X |
| 3,407,045 | 10/1968 | Temple | 55/242 X |
| 3,442,273 | 5/1969 | Hanish et al. | 55/242 X |

Primary Examiner—William A. Cuchlinski, Jr.

[57] ABSTRACT

A cleaning device for a mist eliminator disposed within a wet scrubbing apparatus includes a pair of revolvably mounted horizontally extending spray headers disposed on opposite sides of the mist eliminator. The spray headers are in communication with a spraying solution source.

12 Claims, 4 Drawing Figures

MIST ELIMINATOR CLEANING DEVICE

BACKGROUND OF THE INVENTION

This invention relates to cleaning devices for mist eliminators in a wet scrubbing device. In one aspect it relates to a mist eliminator cleaning device for continual wash of the mist eliminator during operation. In another aspect the invention relates to a mist eliminator cleaning device for washing both upstream and downstream sides of the mist eliminator simultaneously.

In the removal of air polluting materials from dirty gas streams and particularly those which are removed in wet scrubbing devices by chemical reaction, these wet scrubbing devices include mist eliminators therein to prevent mist from being entrained in the gas stream as it leaves the scrubbing unit. These mists generally contain the reacting materials and in many instances the carryover of these liquid solutions in the form of a mist is often very great. For example, in the removal of oxides of sulfur, the scrubbing solutions usually contain calcium in the form of lime or limestone wherein the scrubbing solution including the calcium contacts the oxides of sulfur in the gas stream as the gas stream moves upward through a scrubbing device. Thus, mist is formed containing the oxides of sulfur, the calcium reacting solution, as well as stable products resulting from the reaction of the aforementioned reactive ingredients. The mist is generally trapped by mist eliminators while the chemical reaction is still proceeding. As a result of this contact with the mist eliminator, oxides of sulfur are absorbed in a relatively low pH entrained liquid and precipitation of solids occurs on the demister surfaces. This precipitation can occur rapidly and thereby causes blockage of the gas passage within the demisting elements.

Washing of the mist eliminators is necessary in order to prevent this blockage and is normally accomplished by use of a spray washer or wash lance, similar to a steam generator soot blower. In many installations it has been found that these mist eliminators must be cleaned at least once every 24 hours in order to maintain their effectiveness and this cleaning is generally done with the unit shutdown. A problem of washing is compounded in most mist eliminators by the fact that both upstream and downstream sides of the mist eliminators must be washed.

The most common types of mist eliminator means utilized in wet scrubbers include those having layers of screening, mesh, chain, spheres, or other types of packing which provide high surface area for capturing of entrained mist or droplets and another type, which is preferred in removal of oxides of sulfur, is one utilizing staggered members or closely spaced "zig-zag" shaped plates which traverse a gas passageway to provide an impingement surface area with a multiplicity of narrow, tortuous passageways. This type of mist eliminator arrangement has frequently been referred to as "chevron" packing because of this angular, zig-zag configuration. In either type of mist eliminator packing, cleaning of the mist eliminator is a problem and this cleaning problem is compounded by the fact that both upstream and downstream sides of the eliminator must be cleaned. Furthermore, if this cleaning is done while the scrubber is on line, the entrainment of liquid on the downstream side must be kept at a minimum. Also, when cleaning the mist eliminator while the scrubber is onstream, it is important to maintain the proper PH of the lime or limestone based scrubbing solution with the balance of water in the mist cleaning solution. Thus, only a small quantity of mist eliminator cleaning solution may be utilized.

SUMMARY OF THE INVENTION

In the present invention, it is recognized that it is desirable to provide a means for washing a mist eliminator in a wet scrubbing unit which requires a small amount of wash water on a continual basis. Furthermore, it is recognized that it is desirable to provide a mist eliminator cleaning device which cleans both upstream and downstream sides of a mist eliminator simultaneously. Even further, it is recognized that it is desirable to provide a mist eliminator cleaning device which is utilized while the scrubbing unit remains on stream.

The present invention advantageously provides a straightforward arrangement for a mist eliminator cleaning device which may be utilized for cleaning mist eliminators in a wet scrubbing unit. The present invention further provides a mist eliminator cleaning device that is inexpensive, easy and quickly operable, and requires a small amount of wash water on a continual basis.

Various other features of the present invention will become obvious to those skilled in the art upon reading the disclosure set forth hereinafter.

More particularly, the present invention provides in a gas scrubbing device that includes a vertical housing having a dirty gas inlet in the lower portion thereof and a clean gas outlet disposed in the upper portion thereof in spaced relation from the dirty gas inlet to provide a confined gas flow path for a gaseous stream to be treated, and, means to introduce scrubbing solution within the confined gas flow path and means to remove the scrubbing solution from the housing; the improvement comprising: a mist eliminator disposed within the confined gas flow path through which substantially all of the upwardly flowing gases pass, the mist eliminator being spaced vertically above the means to introduce scrubbing solution; two revolvably mounted spray headers in flow communication with a spraying solution source, one of the headers being disposed above the mist eliminator with means to spray a solution onto the downstream side of the mist eliminator, the other of the headers being disposed beneath the mist eliminator with means to spray a solution onto the upstream side of the mist eliminator; and, drive means for the spray headers.

It is to be understood that the description of the examples of the present invention given hereinafter are not by way of limitation and various modifications within the scope of the present invention will occur to those skilled in the art upon reading the disclosure set forth hereinafter.

Referring to the drawings.

Figure 1:
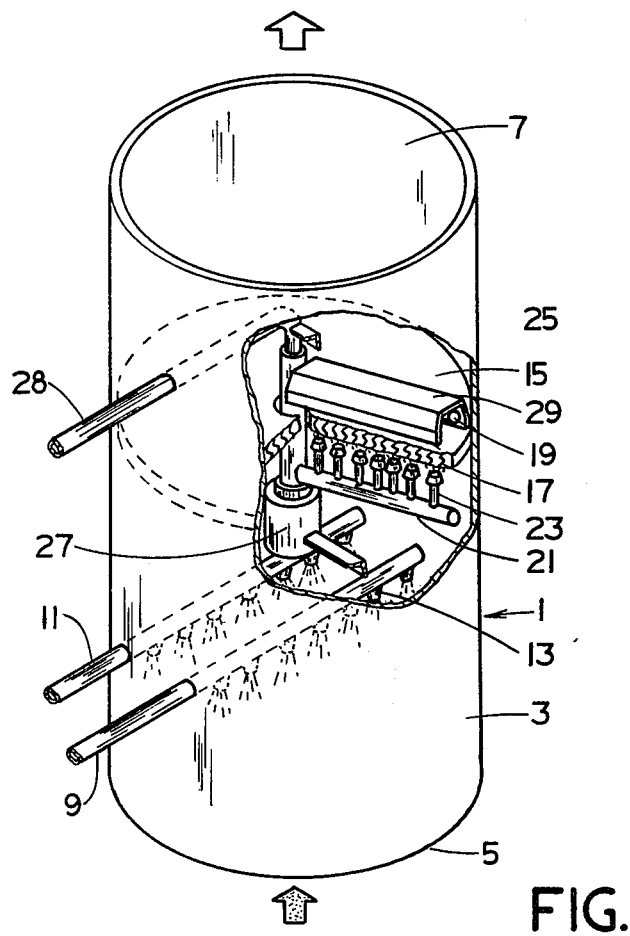
FIG. 1 is a perspective view of a wet scrubbing device, with selected portions cut-away, showing one preferred mist eliminator cleaning device of the present invention.
Figure 2:
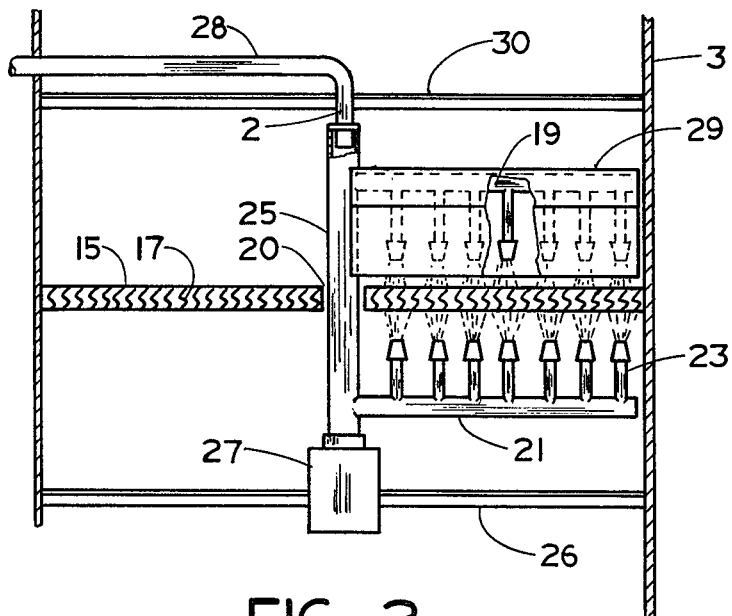
FIG. 2 is a side view, with selected portions cut-away, of the mist eliminator cleaning device of FIG. 1.
Figure 3:
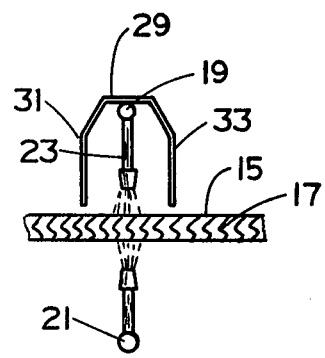
FIG. 3 is a front view of the mist eliminator cleaning device of FIG. 1.

Referring to FIG. 1, a wet scrubbing device 1 is shown, scrubbing device 1 being utilized for removing particulate materials from a waste gas stream. The wet scrubbing device 1 includes a vertically disposed housing 3 with a waste gas inlet 5 in the bottom and a clean gas outlet 7 in the top. The waste gas inlet 5 is connected to a waste gas source (not shown) and the clean gas outlet 7 is connected to other means (not shown) for exhausting the clean gas to the atmosphere. The gas to be cleaned is moved through the device 1 from bottom to top, generally by a fan or the like (not shown) on the upstream side of the clean gas outlet 7.

Mounted within the housing 3 is a pair of spray headers 9 and 11 with a plurality of nozzles 13 therein for spraying a cleaning solution into the waste gas stream. Headers 9 and 11 extend through the side walls of the housing 3 and in fluid communication with a cleaning solution source (not shown). The headers 9 and 11 with nozzles 13 are generally spaced so that all of the waste gas passes through the spray before leaving the scrubbing device 1. Also, means (not shown) are in communication with the lower portion of housing 3 to remove the cleaning solution containing the particulates from the waste gas stream from the scrubbing device 1.

Disposed above the scrubbing zone which is defined by the headers 9 and 11 and the top of the housing 3 is a mist eliminator 15. The mist eliminator 15 is disposed across the gas path as it travels upward through the housing 3 and includes a plurality of zig-zag shaped baffles 17 in a chevron arrangement to remove the mist picked up in the gas stream in the scrubbing zone. The mist which is removed by the baffles 17 includes chemicals utilized in the scrubbing solution as well as particulates removed from the gas stream. These chemicals and particulates build up on the mist eliminator 15 and must be removed periodically.

In my invention, I have devised a device to clean the mist eliminator 15 during the scrubbing operation. This mist eliminator cleaning device includes a pair of revolvably mounted spray headers 19 and 21 disposed on opposite sides of the mist eliminator 15. The spray headers 19 and 21 include a plurality of nozzles 23 directed towards both upsteam and downsteam surfaces of the mist eliminator 15, spray headers 19 and 21 being attached to and in flow communication with a vertically extending rotatable conduit 25 disposed through an opening 20 in the center of the mist eliminator 15. Nozzles 23 are spaced at preselected distances along the headers 19 and 21 to provide uniform coverage of the area to be cleaned. Usually the spray headers 19 and 21 are in parallel and revolve at the same rate.

Rotatable conduit 25 is rotated by appropriate motor driving means 27 which is mounted to the lower end of the conduit 25 and supported by appropriate support members 26 which are attached to the walls of the housing 3. It is realized that the driving means may also be disposed outside the housing 3 with appropriate gearing to rotate the conduit 25. The upper end of the conduit 25 is attached to and in flow communication with a stationary feed conduit 28 which is in turn connected to a water source (not shown). The stationary feed conduit 28 extends horizontally through a side wall of the housing 3 and includes a vertically downward extending portion 2 which is in flow communication with the conduit 25, conduit 28 being supported by appropriate support members 30 which are attached to the walls of the housing 3.

A shroud 29 of generally inverted U-shaped construction is disposed around the downsteam header 19 to reduce or eliminate splashing of spray water into non-shielded areas and to prevent entrainment of the spray water into the downsteam gas steam. Shroud 29 is affixed to the rotatable conduit 25 and extends horizontally the length of the header 19. Furthermore, the lower extremity of the legs 31 and 33 are in close proximity to the mist eliminator so the shroud 29 forms a damper or throttle that causes gas flow to be substantially reduced through the shroud-covered area thereby reducing the potential for entrainment of the spray water into the gas stream downstream from the spray zone.

Figure 4:
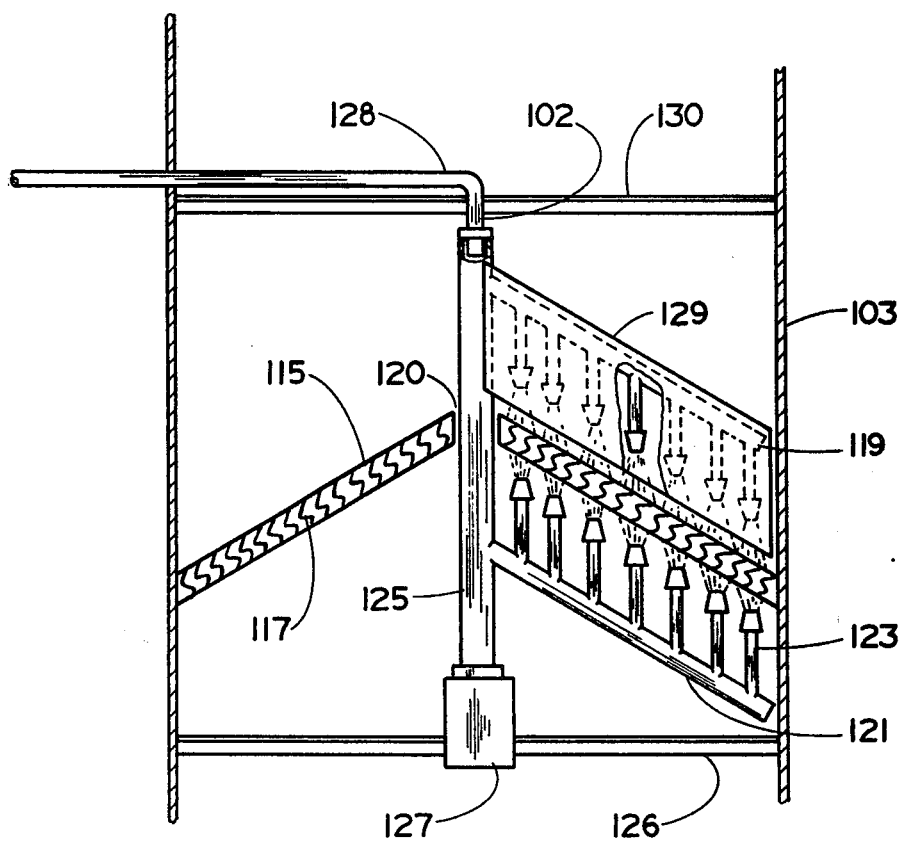
FIG. 4 is a side view, with selected portions cut-away, of another preferred mist eliminator cleaning device of the present invention.

In FIG. 4, a mist eliminator 115 of conical shape is disposed across a gas path as it travels upward through a wet scrubber housing 103, only the cross-section of the housing wall being shown. The mist eliminator 115 includes a plurality of zig-zag shaped baffles 117 in a chevron arrangement to remove the mist picked up in the gas stream in the scrubbing zone, the mist including chemicals and particulates therein building up on the mist eliminator 115.

In the embodiment of FIG. 4, the mist eliminator 115 includes a pair of revolvably mounted spray headers 119 and 121 disposed on opposite sides of the mist eliminator 115, spray headers 119 and 121 being in parallel with mist eliminator 115. The spray headers 119 and 121 include a plurality of nozzles 123 directed towards both upstream and downstream surfaces of the mist eliminator 115, spray headers 119 and 121 being attached to and in flow communication with a vertically extending rotatable conduit 125 disposed through an opening 120 in the center of the mist eliminator 115. Nozzles 123 are spaced at preselected distances along the headers 119 and 121 to provide uniform coverage of the area to be cleaned. Usually the spray headers 119 and 121 are in parallel and revolve at the same rate.

Rotatable conduit 125 is rotated by appropriate motor driving means 127 which is mounted to the lower end of the conduit 125 and supported by appropriate support members 126 which are attached to the walls of the housing 103. The upper end of the conduit 125 is attached to and in flow communication with a stationary feed conduit 128 which is in turn connected to a water source (not shown). The stationary feed conduit 128 extends horizontally through a side wall of the housing 103 and includes a vertically downward extending portion 102 which is in flow communication with the conduit 125, conduit 128 being supported by appropriate support members 130 which are attached to the walls of the housing 103.

A shroud 129 of generally inverted U-shaped construction is disposed around the downstream header 119 to reduce or eliminate splashing of spray water into non-shielded areas and to prevent entrainment of the spray water into the downstream gas stream. Shroud 129 is affixed to the rotatable conduit 125 and extends angularly the length of the header 119. Furthermore, the lower extremity of the shroud 129 is in close proximity to the mist eliminator so the shroud 129 forms a damper or throttle that causes gas flow to be substantially reduced through the shroud-covered area thereby reducing the potential for entrainment of the spray water into the gas stream downstream from the spray zone.

It will be realized that various changes may be made to the specific embodiment shown and described without departing from the principles of the present invention.

What is claimed is:

1. In a gas scrubbing device that includes a vertical housing having a dirty gas inlet disposed in the lower portion thereof and a clean gas outlet disposed in the upper portion thereof in spaced relation from the dirty gas inlet to provide a confined gas flow path for a gaseous stream to be treated, and, means to introduce scrubbing solution within the confined gas flow path and means to remove the scrubbing solution from the housing; the improvement comprising:

- a mist eliminator disposed within the confined gas flow path through which substantially all of the upwardly flowing gases pass, the mist eliminator being spaced vertically above the means to introduce scrubbing solution;
- two revolvably mounted spray headers in flow communication with a spraying solution source, one of the headers being disposed above the mist eliminator with means to spray a solution onto the downstream side of the mist eliminator, the other of the headers being disposed beneath the mist eliminator with means to spray a solution onto the upstream side of the mist eliminator; and,
- drive means for the spray headers whereby said mist eliminator is cleanable during normal operations.

2. The device of claim 1 wherein said housing is substantially round, the spray headers being attached in flow communication with a vertically extending rotatably mounted conduit extending through the center of said mist eliminator.

3. The device of claim 2, said rotatably mounted conduit being in flow communication with said spraying solution source.

4. The device of claim 3, said spraying solution source including a stationarily mounted horizontally extending conduit extending through a wall of said housing with a vertically extending portion in flow communication with said rotatable conduit.

5. The device of claim 4, said horizontal conduit being spaced above said headers, said vertical portion of said conduit extending downwardly.

6. The device of claim 3, said drive means being mounted onto said rotatable conduit on the end opposed to said flow communication with said spraying solution source.

7. The device of claim 1, said means to spray a solution being a plurality of nozzles spaced at preselected distances along said headers.

8. The device of claim 1, said one of said headers having a shroud of U-shaped cross-section, inversely disposed, attached thereto surrounding said one of said headers and revolvable therewith.

9. The device of claim 8, the lower extremity of said shroud being adjacent to the downstream side of said mist eliminator.

10. The device of claim 1, said revolvably mounted spray headers being in parallel and revolvable at the same rate.

11. The device of claim 1, said spray headers and mist eliminator being horizontally extending.

12. The device of claim 1, said mist eliminator being conical shape, said spray headers being disposed angularly in parallel with said mist eliminator.

* * * * *